3,629,196
FLUORINE AND SILICON CONTAINING
POLYCONDENSATES
Helmut Hahn, Burghausen (Salzach), Siegfried Rebsdat, Altotting, Kasimir Ruchlak, Burgkirchen (Alz), and Erich Schuierer, Burghausen (Salzach), Germany, assignors to Farbwerke Hoechst Aktiengesellschaft vormals Meister Lucius & Bruning, Frankfurt am Main, Germany
No Drawing. Filed Aug. 21, 1969, Ser. No. 852,087
Claims priority, application Germany, Aug. 30, 1968,
P 17 95 262.4
Int. Cl. C08f 11/04
U.S. Cl. 260—46.5 E  4 Claims

ABSTRACT OF THE DISCLOSURE

Polycondensates of the formula

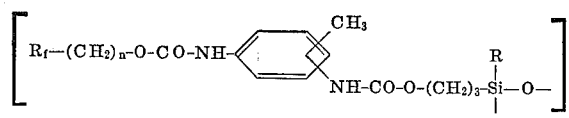

in which $R_f$ is perfluoroalkyl of 6 to 12 carbon atoms, R is a group of the formula —O— or lower alkyl, $n$ is an integer of 1 to 4 and Z is a number of from about 10 to about 100, are useful as oleo- and hydrophobic agents for textile materials, especially for wool and cotton.

---

The present invention relates to new fluorine and silicon containing polycondensates, to a process for their preparation, and to processes for rendering textile materials oil- and water repellent therewith.

More specifically, this invention relates to polycondensates of the Formula I

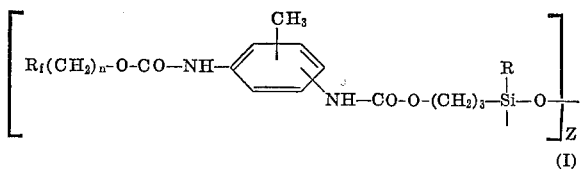

in which $R_f$ is perfluoroalkyl of 6 to 12 carbon atoms, R is a group of the formula —O— or lower alkyl, $n$ is an integer of 1 to 4 and Z is a number of from about 10 to about 100.

It is known from French Patent No. 1,438,617 that isocyanates of the Formula II

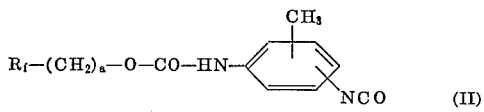

in which $a$ is 0 or an integer, and $R_f$ has the meaning given above, react with textile fibers and impart to them oleo- and hydrophobic properties.

These properties can be improved by reacting said isocyanates with allyl alcohol, preferably in the presence of catalytical amounts of a tertiary amine, particularly pyridine, to yield products of the following constitution established by infrared spectra:

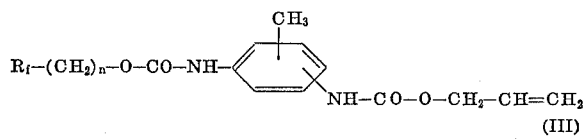

In this Formula III, $R_f$ and $n$ have the meanings given above.

These substituted diurethanes have proved, after their polymerization, to be especially useful for oleophobizing cotton.

When the oil repellency values obtained for wool and cotton according to the evaluation method indicated in U.S. Patent No. 3,362,782, column 4, are compared, the products applied in an amount of 0.5% provide a value of about 130 on cotton and the substantially excellent value of 120 for wool.

It has now been found that compounds which exhibit still more favorable oil repellency values for wool can be obtained by reacting the reaction product of isocyanate and allyl alcohol corresponding to Formula III in a further step with alkyldichlorosilanes or trichlorosilane, and then adding stoichiometrical amounts of water to the product thus obtained. The reaction with trichlorosilane or alkyl-dichlorosilanes, preferably methyl-dichlorosilane, is advantageously carried out under an atmosphere of an inert gas in the presence of platinum compounds, preferably hexachloroplatinic acid, as catalyst at a temperature of from 50 to 120° C., say below 100° C. at a temperature of 20 to 100° C. the reaction product is after-treated with water. The addition of water leads to polycondensation with the formation of —Si—O—Si— bonds and thus to the formation of resins which are very readily soluble in polar organic solvents, especially in acetone and dimethylformamide. These resins, dissolved in acetone, are preferably used as oil repellent agents, and a concentration of 1% by weight, generally already 0.5% by weight, thereof is sufficient to provide an oil repellency value of more than 110.

A surprising property of the products is their excellent fastness to washing: Even after having been washed several times fabrics treated therewith still exhibit oil repellency values of from 100 to 120.

The following examples serve to illustrate the invention, but they are not intended to limit it thereto.

EXAMPLE 1

17.4 grams (0.1 mol) of toluene-diisocyanate (distribution of isomers: about 80% of 2,4-toluene-diisocyanate and about 20% of the 2,6-isomer) were added dropwise while stirring at 60° C. to a solution of 40 g. (0.1 mol) of 1,1-dihydropentadecafluoro-octan-1-ol in 200 ml. of dimethylformamide, while the temperature was allowed to rise to 80–85° C. After cooling to 50° C., 5.8 g. (0.1 mol) of allyl alcohol was added in small portions to the reaction mixture, and the whole was allowed to stand for 1 hour at 85° C. after evaporation of the solvent a yellowish viscous oil was obtained, 0.1 mol of which was combined with $10^{-3}$ mol of hexachloroplatinic acid and, under a nitrogen atmosphere, with 0.1 mol of methyl-dichlorosilane. The reaction mixture was maintained, while stirring, at 70–80° C. for 3 to 4 hours. After cooling a viscous oil having a stinging smell was obtained, 0.1 mol of which was combined, while stirring, at 80° C. with 0.2 mol of water. Advantageously, the water acted upon the product for about 1 hour. After cooling a yellowish resin was obtained which was readily soluble in acetone as well as in other solvents, for example chloroform. The course of the reaction as indicated above could be controlled by means of infrared spectra (cf. Bellamy, "Ultra-rot-Spektrum und chemische Konstitution," 2nd edition, Darmstadt 1966, page 170). The amide bands for the carbonyl absorption and the NH-deformation as well as the NH valence vibration were in perfect line with the values to be expected according to Bellamy.

The products obtained according to the invention were evaluated with regard to their oil-repellent capacity in accordance with the evaluation method indicated in U.S.

Patent No. 3,362,782, using mixtures of n-heptane and paraffin oil, according to the following scale:

| Oil repellency value | n-Heptane (in percent by volume) | Paraffin oil DAB 6 (in percent by by volume) |
|---|---|---|
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |

The hydro- and oleophobic effect of the product, especially on wool, is demonstrated by excellent values which, already in an amount of 0.5% (calculated on the total solids content), exceed 110, and in an amount of 1%, exceed the oil repellency value of 120.

The following table shows that the oleophobic effect both on cotton and on wool remained positive even after washing five times.

TABLE.—OIL REPELLENCY

Cotton: [1]
- Not washed _____ 110
- Washed:
  - 1 time _____ 110
  - 2 times _____ 100
  - 5 times _____ 100
- Cleaned 1 time with $CCl_4$ _____ 80

Wool: [1]
- Not washed _____ 120
- Washed:
  - 1 time _____ 120
  - 2 times _____ 120
  - 5 times _____ 120

[1] Amount applied: 1%, calculated on the weight of the fabric, dried at 130° C.

NOTE.—Water repellency always present.

EXAMPLE 2

0.2 mol of toluene-diisocyanate (distribution of isomers: about 80% of 2,4-toluene-diisocyanate and about 20% of the 2,6-isomer) was added while stirring at 60° C. to 0.2 mol of 1,1-dihydro-pentadecafluoro-octanol-(1), while the temperature was allowed to rise to 80-85° C. After cooling to 50° C., the reaction mixture was reacted with 0.2 mol of allyl alcohol to yield the diurethane as disclosed in Example 1. Under a nitrogen atmosphere the reaction product was heated together with 0.2 mol of trichlorosilane and 40 mg. of hexachloroplatinic acid to 85° C. for 48 hours in a V4A-steel autoclave having a capacity of 200 ml. The stringent smelling oil obtained was then hydrolized at 80° C. with 0.6 mol of water (for 1 hour). The yellowish resin obtained was readily soluble in acetone.

OIL-REPELLENCY (AMOUNT APPLIED 1%)

Cotton:
- Not washed _____ 120/+
- Washed:
  - 1 time _____ 100/—
  - 2 times _____ 90/—
  - 5 times _____ 90/—
- Dry cleaning with $CCl_4$ _____ 80

Wool:
- Prewashed _____ 110/+
- Washed:
  - 1 time _____ 100/+
  - 2 times _____ 100/+
  - 5 times _____ 100/+

+ = Water repellency.   — = No water repellency.

We claim:
1. A polycondensate of the formula

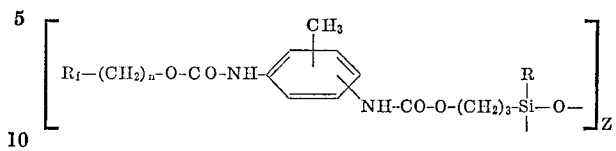

in which $R_f$ is perfluoroalkyl of 6 to 12 carbon atoms, R is a group of the formula —O— or lower alkyl, $n$ is an integer of 1 to 4 and Z is a number from about 10 to about 100.

2. The polycondensate as claimed in claim 1, wherein $R_f$ is perfluoro-n-alkyl of 6 to 12 carbon atoms.

3. A process for the preparation of a polycondensate of the formula

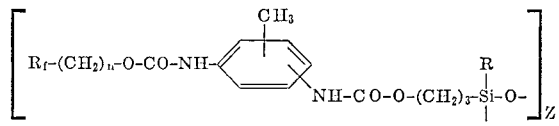

in which
$R_f$ is perfluoroalkyl of 6 to 12 carbon atoms,
R is a group of the formula —O— or lower alkyl,
$n$ is an integer of 1 to 4 and
Z is a number from about 10 to about 100, which comprises reacting a compound of the formula

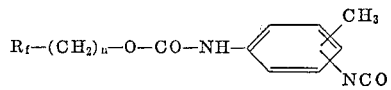

in which
$R_f$ and $n$ have the meanings given above, at a temperature of from 20 to 120° C. with allyl alcohol, adding to the so-obtained bisurethane at a temperature of from 50 to 120° C. a compound of the formula

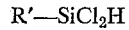

in which
R' is chlorine or lower alkyl, in the presence of catalytical amounts of hexachloroplatinic acid in an atmosphere of an inert gas and treating the so-obtained adduct of a stoichiometric amount of water at a temperature of 20 to 100° C.

4. The process as claimed in claim 3, wherein the reaction with allylalcohol is performed in the presence of catalytical amounts of a tertiary amine.

References Cited

UNITED STATES PATENTS 3,426,057  2/1969  Kanner _____ 260—448.2
3,502,704  3/1970  McKellar _____ 260—448.8

DONALD E. CZAJA, Primary Examiner

M. I. MARQUIS, Assistant Examiner

U.S. Cl. X.R.

117—139.5 A, 143 A; 260—32.6 N, 32.8 R, 32.8 SB, 77.5 AP, 77.5 AT, 448.2 N